(12) United States Patent
Arasu et al.

(10) Patent No.: US 7,865,505 B2
(45) Date of Patent: Jan. 4, 2011

(54) EFFICIENT EXACT SET SIMILARITY JOINS

(75) Inventors: Arvind Arasu, Redmond, WA (US);
Venkatesh Ganti, Redmond, WA (US);
Kaushik Shriraghav, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 11/668,870

(22) Filed: Jan. 30, 2007

(65) Prior Publication Data

US 2008/0183693 A1 Jul. 31, 2008

(51) Int. Cl.
*G06F 7/00* (2006.01)
*G06F 17/30* (2006.01)
(52) U.S. Cl. .................. 707/719; 707/713; 707/714
(58) Field of Classification Search ............... 707/100, 707/713, 714, 719
See application file for complete search history.

(56) References Cited

U.S. PATENT DOCUMENTS

2004/0093320 A1* 5/2004 Shin ........................... 707/2
2005/0086224 A1* 4/2005 Franciosa et al. ............ 707/6

OTHER PUBLICATIONS

Sarawagi, Sunita et al, "Efficient set joins on similarity predicates", Jun. 13, 2004, ACM, pp. 743-754 (1 through 12).*
Arasu, et al. "Efficient Exact Set-Similarity Joins" (2006) ACM, 12 pages.

* cited by examiner

*Primary Examiner*—Apu M Mofiz
*Assistant Examiner*—Jared M Bibbee
(74) *Attorney, Agent, or Firm*—Lee & Hayes, PLLC (57) ABSTRACT

A machine implemented system and method that efficiently facilitates and effectuates exact similarity joins between collections of sets. The system and method obtains a collection of sets and a threshold value from an interface, and based at least in part on an identifiable similarity, such as an overlap or intersection, between the collection of sets the analysis component generates and outputs a candidate pair that at least equals or exceeds the threshold value.

21 Claims, 6 Drawing Sheets

| <10, {2, 3}> | <00, {1, 3}> | <01, {1, 2}> |
| <10, {5, 6}> | <10, {4, 6}> | <11, {4, 5}> |

EFFICIENT EXACT SET SIMILARITY JOINS

BACKGROUND

Computing and network technologies have transformed many aspects of everyday life. Computers have become household staples rather than luxuries, educational tools and/or entertainment centers, and provide individuals and corporations with tools to manage and forecast finances, control operations such as heating, cooling, lighting and security, and store records and images in a permanent and reliable medium. Networking technologies like the Internet provide individuals virtually unlimited access to remote systems, information and associated applications.

As computing and network technologies have evolved and have become more robust, secure and reliable, more consumers, wholesalers, retailers, entrepreneurs, educational institutions and the like are shifting paradigms and are employing the Internet to perform business rather traditional means. For example, today consumers can access their bank accounts on-line (e.g., via the Internet) and can perform an ever growing number of banking transactions such as balance inquiries, fund transfers, bill payments, and the like.

Typically, an on-line session can include individuals interfacing with client applications (e.g., web services) to interact with a database server that stores information in a database accessible to client applications. For instance, a stock market web site can provide users with tools to retrieve stock quotes and purchase stock. Users can enter stock symbols and request stock quotes by performing mouse clicks to activate a query. Client applications can then query databases containing stock information and return appropriate stock quotes. Users, based on returned stock quote information, can thereafter purchase or sell stocks by supplying suitable information, wherein submitting buy or sell orders initiate database queries to return current pricing information and order status.

When provided with collections of sets, set-similarity joins are capable of identifying all pairs of sets, one from each collection, that have high overlap. Set-similarity Joins (SS-Joins) are a useful primitive that can be employed to implement similarity joins involving other types of data, and has numerous applications. However, to date, implementation of set-similarity joins has been deficient in that such implementations have not always produced exact answers and/or have not provided precise performance guarantees. Rather previous implementations have either been probabilistically approximate with performance guarantees, or exact but without performance guarantees. As such, probabilistically approximate approaches can miss some output pairs with a small probability, while exact techniques always produce the correct answer but without appropriate performance guarantees.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

Given two input collections of sets, a set-similarity join (SSJoin) identifies all pairs of sets, one from each collection, that have high overlap. SSJoin is a useful primitive that can be employed to implement similarity joins involving other types of data (e.g. sequences), and has numerous other applications, such as data cleaning, data mining, and genome sequencing, for example. The claimed subject matter provides systems and methods for implementing SSJoin, that are exact (e.g. they always produce the correct answer), and that carry precise performance guarantees; this is in contrast to previous techniques that have provided performance guarantees that were probabilistically approximate.

The claimed subject matter as claimed and disclosed herein in one aspect relates to systems and methods that effectuate exact similarity joins between a first input set and a second input set wherein overlaps between the two input sets are identified as possible candidate pairs and thereafter select candidate pairs are output based on whether or not the selected candidate pairs meet or exceeds a specified threshold value.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

Data collections often have various kinds of inconsistencies that have to be corrected before they can be meaningfully employed. The process of correcting such inconsistencies is known as data cleaning. A common form of inconsistency arises when a real-world entity has more than one representation in the data collection (e.g., the same address can be encoded using different strings in different records of a database). Multiple representations arise due to a variety of natural reasons such as misspellings caused by typographic errors and different formatting conventions utilized by data sources. For analysis purposes, it is important to reconcile multiple representations of an entity into a single canonical representation.

Figure 1:
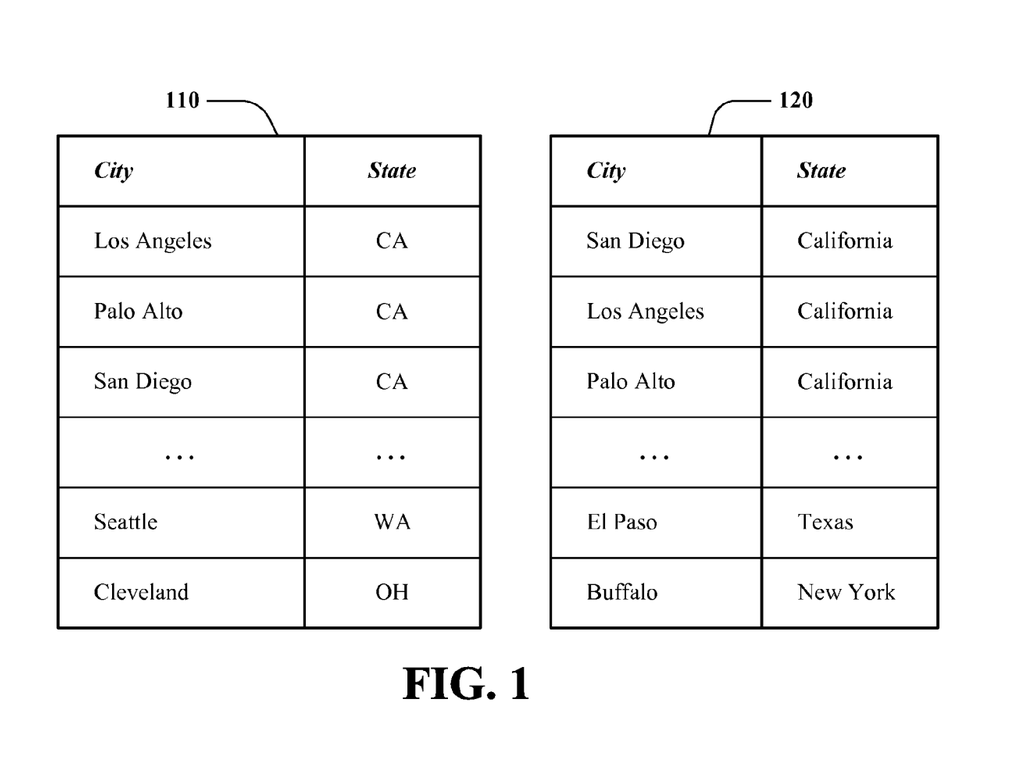
FIG. 1 illustrates data base tables subject to data cleaning that can benefit from utilization of the claimed subject matter.

A variety of techniques have been posited to resolve this issue, and at their core, most involve employing similarity joins (e.g., an operation that associates similar data values in a collection). For instance, a similarity join over strings can be used to identify similar pair names, and therefore locate potential name misspellings (e.g., John and Jhon, Oxford and Ofxord, microsoft and mcrosoft, . . . ). Even when different representations of an entity have no obvious syntactic similarity, similarity joins can be useful. For example, FIG. 1 illustrates two tables 110 and 120 respectively that can be subject to data cleaning. As depicted table 110 contains city/state pairs wherein the attribute for the state name has been entered using generally understood abbreviations. Similarly, table 120 also represents city/state pairs, however, in table 120 the state attribute has been entered employing the proper name (e.g., the expanded representation) of the state. Nevertheless, perusal of tables 110 and 120 indicates that CA and California refer to the same state based on the fact that there is a high degree of similarity in the associated set of cities. Therefore, by performing similarity joins over the sets of cities in tables 110 and 120, the abbreviated and expanded representations can be paired accordingly.

Traditionally, a variety of similarity/distance functions over strings, such as, for example, edit distance, jaccard similarity, cosine similarity, generalized edit distance have been utilized to capture the notion of similarity. Nevertheless, to date no single similarity function is known to be the overall best similarity function, and the choice generally depends on the application domain. For example, the similarity function for matching product names varies considerably from one for matching addresses where even small differences in street numbers such as "$148^{th}$ Ave" and "$147^{th}$ Ave" are crucial.

Comprehensive research has recently identified set-similarity join (SSJoin) as being a foundational primitive operator that can be employed to support similarity joins involving other similarity and distance functions such as, for example, edit distance, jaccard similarity, generalized edit distance, hamming distance, soundex, and the like. A set-similarity join can be defined as follows. Given two input collections of sets, identify all pairs of similar sets, one from each collection, for some definition of similarity.

While the subject matter as disclosed and claimed herein is primarily elucidated in terms of application to data cleaning, the claimed subject matter can find application in several other endeavors where similarity joins and (indirectly) set-similarity joins are applicable. For example, in web informatics, identifying pairs of similar web pages can be used to find topically related pages, detect copyright infringement, and identify mirrors. Similarly, in data mining, identifying pairs of items with similar buying patterns is an important operation. Further, genome sequencing can benefit from utilization of the claimed subject matter in that there is a need to identify highly similar subsequences from two genome sequences, in order to align these two sequences.

Heretofore there has been considerable work on set-similarity joins. This work can broadly be categorized as pertaining to techniques that are either probabilistically approximate (hereinafter simply referred to as approximate) with performance guarantees and all based on the idea of locality-sensitive hashing (LSH) or exact but without performance guarantees. Approximate approaches can miss some output set pairs with a small probability, while exact approaches always produce the correct answer. Conceptually, approaches that belong to both categories first generate candidate pairs of sets, and then check, for each candidate pair, if the sets are similar or not. The efficiency of a technique depends on the number of candidate pairs; the fewer the number, the more efficient the approach. Approximate approaches provide a guarantee, albeit probabilistic, that if two sets are highly dissimilar, they will not be generated as a candidate pair, while none of the exact techniques provide such a guarantee.

There are several reasons why exact answers for SSJoins are important. First, in data cleaning applications, an SSJoin is typically employed, not as a standalone operator, but as part of a larger query. When the answer of an SSJoin is not exact it is difficult to assign clean semantics to the query it is part of. Additionally, recent work has explored alternate settings, where data cleaning is performed contemporaneously during evaluation, and not as a one-time offline process. Exact SSJoin answers are important for this situation. Second, there has been a recent trend towards integrating greater Information Retrieval (IR) functionality (e.g., support for text columns) within Database Management Systems (DBMS). Such integration makes a stronger case for supporting SSJoins with regular Database Management Systems. Exact SSJoin answers are important in this situation since SSJoins can be combined arbitrarily with other operators.

The subject matter as claimed thus provides several techniques and/or approaches for SSJoins that handle common similarity functions such as for example, jaccard, weighted jaccard, and hamming (e.g., when sets are represented as binary vectors). The approaches elucidated herein share common themes, namely: for each input set the techniques enumerate a number of subsets of the set, with the property that if two sets are similar, at least one of the enumerated subsets is identical. This property can be used to generate candidate pairs of sets. For unweighted jaccard similarity and similarity based on hamming distance, the modalities employed by the claimed subject matter have guarantees similar to those of Locality-Sensitive Hashing (LSH)-based probabilistically approximate approaches, wherein if two sets are very dissimilar they are not generated as a candidate pair with high probability.

Prior to embarking on an expansive discussion of the claimed subject matter, the following preliminaries need to be comprehended. Formally, a set-similarity join takes as input two set collections, R and S, and produces as output all pairs (r, s), r∈R, s∈S, such that $Sim(r, s) \geq \pi$, where Sim denotes a similarity function and γ denotes a threshold parameter. Sometimes, it is convenient to define set-similarity joins using distance functions instead of similarity functions. In this case, the output of an SSJoin is all pairs (r, s)∈R×S, such that $Dist(r, s) \leq k$, for some distance function Dist and threshold k.

For simplicity of presentation it can be assumed that the domain of elements is $\{1, \ldots, n\}$ for some finite, but possibly large n. In other words, $r \subseteq \{1, \ldots, n\}$ and $s \subseteq \{1, \ldots, n\}$ for each $r \in R$, and each $s \in S$. None of the techniques and/or approaches disclosed and claimed herein need require the domain of elements to be finite and integral, and can be generalized to handle infinite and non-integer domains.

By way of illustration and not limitation, the claimed subject matter is exposited primarily with SSJoins involving jaccard similarity and hamming distance, which are two common functions for defining similarity between sets. The jaccard similarity of two sets r and s, denoted $J_s(r, s)$, is defined as:

$$J_s(r, s) = \frac{|r \cap s|}{|r \cup s|}$$

$J_s(r, s)$ is a value between 0 and 1. A weighted version of jaccard similarity can thus be defined and obtained by replacing set sizes with weighted set sizes in the definition of unweighted jaccard similarity. The weighted size of a set s is defined as $$|s| = \sum_{e \in s} w(e),$$

where w(e) denotes the weight of element e. It should be noted however, that unweighted jaccard similarity is a special case of weighted jaccard similarity when weights of all elements are 1. For example, consider the 3-gram sets of the strings washington and woshington shown below:

$s_1$={was, ash, shi, hin, ing, ngt, gto, ton}
$s_2$={wos, osh, shi, hin, ing, ngt, gto, ton}

The sets $s_1$ and $s_2$ share 6 of their 8 elements, and therefore their jaccard similarity is 6/10=0.6. For illustration of weighted jaccard similarity, assume that the weight of a 3-gram is 1 if it contains a vowel, and 5, otherwise. For instance, was, wos, ash, osh, shi, hin, ing, gto, and ton will be assigned weight 1, and ngt assigned weight 5. Thus, for this illustrative weight function, the weighted size of $(s_1 \cap s_2)$ is 10, and that $(s_1 \cup s_2)$ is 14. Therefore, weighted jaccard similarity of $s_1$ and $s_2$ is 10/14=0.714.

Additionally, a set $s \subseteq \{1, \ldots, n\}$ can be viewed as a n-dimensional binary vector v, such that v[i]=1 if i∈s, and v[i]=0, otherwise (v[i] denotes the value of vector v on the ith dimension). The hamming distance between two vectors $v_1$ and $v_2$, denoted $H_d(v_1, v_2)$, is the number of dimensions on which the two differ. It should be noted that in many instances, for the purposes of clarity of exposition, the distinction between sets and binary vectors has been blurred. For example, the hamming distance between two sets can mean the hamming distance of their vector representations. As a further note, the hamming distance between two sets $s_1$ and $s_2$ can be the size of their symmetric difference: $H_d(s_1, s_2) = |(s_1 - s_2) \cup (s_2 - s_1)|$. For instance, the hamming distance in the forgoing Washington/woshington illustration is 4.

Figure 2:
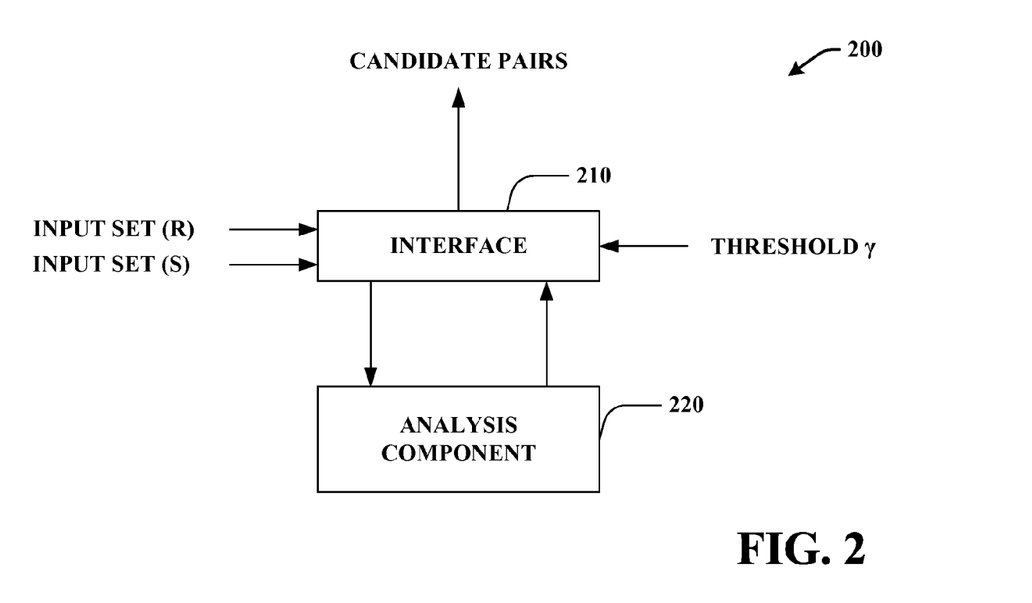
FIG. 2 depicts a machine implemented system that generates candidate pairs via signature based approaches in accordance with one aspect of the claimed subject matter.

FIG. 2 illustrates a system 200 that generates candidate pairs via a technique known as a signature-based approach. System 200 includes an interface 210 that receives as input two sets, R and S, for which similarity is to be ascertained and a threshold value γ. Upon receipt, the two sets, R and S, and the threshold value are conveyed to an analysis component 220. Analysis component 220 generates a set of signatures for each set in R∪S such that the signatures generated have the property that if the similarity function Sim(r, s)≧γ, r and s share a common signature. Based on this property, the analysis component 220 generates candidate pairs by identifying all (r, s)∈R×S such that the set of signatures of r and s overlap, and then checks the similarity join condition Sim(r, s)≧γ for each candidate pair (r, s), at which point analysis component 220 outputs those candidate pairs that satisfy the condition.

It should be noted for the sake of brevity that several engineering details that would be understood by those reasonably skilled have been left unspecified. For example, a variety of indexing and join techniques can aid in expediting generation of candidate pairs, and candidate pair generation and post-filtering (e.g., checking the similarity join condition Sim(r, s)≧γ for each candidate pair (r, s)) can be performed in a pipelined fashion.

As utilized in this application, the notation Sign(s) denotes signatures generated by a signature scheme for an input set s. It should be noted by way of observation rather than limitation that the notation does not explicitly identify the signature scheme which should be clear from the context. Any signature scheme has a basic correctness requirement. For instance, for any two sets r and s, Sign(r)∩Sign(s)≠∅, whenever Sim(r, s)≧γ; here Sim is the SSJoin similarity function and γ is the similarity threshold. The correctness requirement can be satisfied probabilistically which is generally the case of LSH-based techniques; a technique with such a signature scheme can be classified as probabilistically approximate, (e.g., it may omit some output pairs).

As a point of observation rather than limitation, it should be noted that the notation Sign(s) can be slightly misleading, since the set of signatures for s need not be a function of s alone. There can be several "hidden parameters" that can influence the set of signatures for s. These parameters can include the SSJoin threshold γ, statistics collected from R and S, such as frequency of elements, and random bits used for randomization. Thus, when the notation Sign(s) is employed herein, the hidden parameters should be clear from the context.

Figure 3:
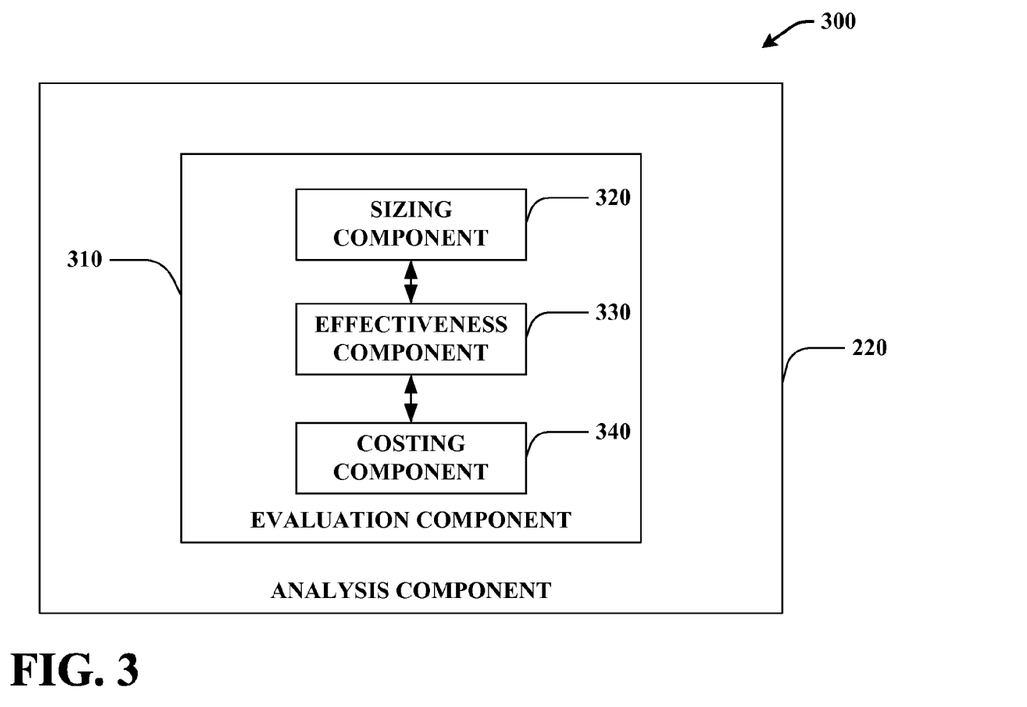
FIG. 3 is a more detailed depiction of an analysis component in accordance with another aspect of the subject matter as claimed.

FIG. 3 provides a more detailed depiction 300 of analysis component 220 wherein an evaluation component 310 that can be employed to evaluate-signature based techniques is illustrated. Evaluation component 310 can include sizing component 320 that can gauge the number of signatures generated for a given set, effectiveness component 330 that can provide indication of how good a signature scheme is in minimizing false positives, and costing component 340 that can for a given input compute the total cost of computing an SSJoin using a signature-based technique.

Sizing component 320 can ascertain the number of signatures that can be generated for a given input set. The number of signatures generated need not be a fixed value, but can be a function that depends on properties of the input set itself, such as, for example, the set size and various input parameters (e.g., the similarity threshold γ). The sum of the signature-set sizes of all the set in (R∪S) linearly affects the overall costs associated with generating signature-sets for Sign(r) and Sign(s) and generating all candidate pairs (r, s), r∈R, s∈S satisfying Sign(r)∩Sign(s).

Effectiveness component 330 determines the number of false positive candidate pairs. All practical signature schemes and approaches at some point produce false positive candidate pairs (e.g., (r, s) such that Sign(r)∩Sign(s)≠∅ and Sim(r, s)<γ. The number of false positive candidate pairs linearly affects the costs associated with generating all candidate pairs (r, s), r∈R, s∈S satisfying Sign(r)∩Sign(s), and with ensuring that any output candidate pair (r, s) satisfies Sim(r, s)≧γ, and thus it is desirable to minimize the number false positives accruing. The effectiveness component thus provides indication of how well a particular signature scheme (e.g., particularly, those based on LSH) is in minimizing false positives and can be quantified precisely: For any sets r and s, $\text{Sign}(r) \cup \text{Sign}(s) \neq \emptyset$ is a random event whose probability is a decreasing function of $\text{Sim}(r, s)$.

Costing component 340 can for a given input compute the total cost of computing an SSJoin using a signature-based technique. Costing component 340 can employ the following expression to determine the total cost of computing an SSJoin:

$$\sum_{r \in R} |\text{Sign}(r)| + \sum_{s \in S} |\text{Sign}(s)| + \sum_{(r,s)} |\text{Sign}(r) \cap \text{Sign}(s)|$$

The foregoing expression employed by costing component 340 provides a convenient single value that represents the total work done by a signature-based algorithm. The first two terms capture the amount of work done for signature generation (e.g., generating a signature set $\text{Sign}(r)$ for each $r \in R$, and a signature set $\text{Sign}(s)$ for each $s \in S$), and the third term captures the work done for candidate pair generation (e.g. generating all candidate pairs $(r, s)$, $r \in R$, $s \in S$ satisfying $\text{Sign}(r) \cap \text{Sign}(s) \neq \emptyset$. As an observation rather than limitation, it should be noted that the expression above may not be an accurate reflection of the total computation cost. Nevertheless, the utility of the expression stems from the fact that it is independent of the engineering details that can be used in the implementation of signature based techniques, and conveniently, for self-SSJoins, the expression is within a factor 2 of the $F_2$ measure of signatures of all input sets.

Figure 4:
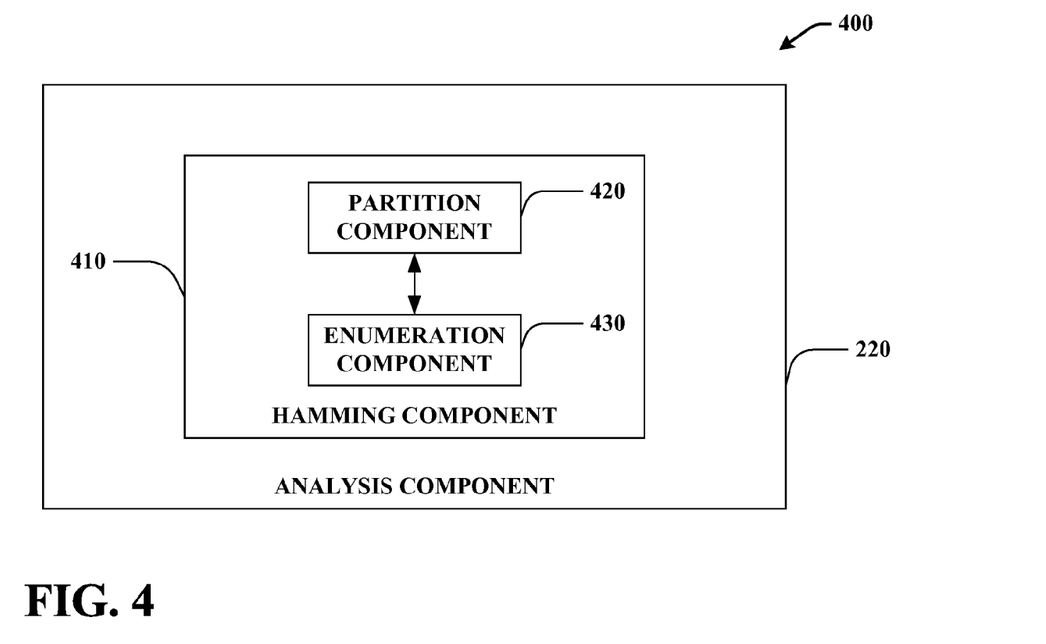
FIG. 4 provides a further illustration of an analysis component in accordance with a further aspect of the claimed subject matter.

FIG. 4 provides a further depiction 400 of analysis component 220 that in one aspect can include hamming component 410 for hamming SSJoins. Hamming component 410 individually and/or in combination with further components described infra, can form a building block for jaccard SSJoins. For the purposes of clarity of elucidation rather than limitation sets hereinafter are represented as binary vectors and further hamming component 410 and its functionality can be exposited through the following vector based join problem: Given two vector collections U and V, identify all pairs $(u, v) \in U \times V$ such that $H_d(u, v) \leq k$ assuming that $\{1, \ldots, n\}$ is the domain of elements, so all vectors $u \in U$ and $v \in V$ are n-dimensional.

As illustrated in FIG. 4 hamming component 410 can further include partitioning component 420 and enumeration component 430. Partitioning component 420 partitions the input set $\{1, \ldots, n\}$ into k+1 equi-sized partitions. Any two vectors that have a hamming distance $\leq k$ must agree on at least one of these partitions, since the dimensions on which they disagree can fall into at most k partitions. Based on this observation partitioning component 420 can construct a simple signature scheme as follows. For each vector v, generate k+1 signatures by projecting v along each of the k+1 partitions. As a point of observation rather than limitation, this scheme has poor filtering effectiveness since two vectors often end up "accidentally" agreeing on a partition if they are very dissimilar, and therefore end up sharing a signature.

Additionally, hamming component 410 can further include enumeration component 430 that utilizes the observation that where partitioning component 420 has created partitions of dimensions such that $n_2 > k$ equi-sized partitions, that any two vectors with hamming distance $\leq k$ must agree on at least $(n_2-k)$ partitions. Thus, enumeration component 430 can construct the following signature scheme: For each vector v, select $(n_2-k)$ partitions in every possible way, and for each selection, generate a signature by projecting v along these $(n_2-k)$ partitions. There are $$\binom{n_2}{k}$$

signatures for each vector v. This scheme has good filtering effectiveness if one sets $n_2 \approx 2k$, but the drawback is that it generates around $$\binom{2k}{k} \approx 2^{2k}$$

signature per vector for this setting.

When partition component 420 and enumeration component 430 operate in concert the following observation can be utilized. If one considers partitioning of the domain into $n_1 = (k+1)/2$ partitions and further considers two vectors u and v with $H_d(u, v) \leq k$. Then by using a simply counting argument, one can show that the projections of u and v along at least one of these partitions have hamming distance $\leq 1$. Thus, employing this observation with partition component 420 and enumeration 430 acting in conjunction, the following signature scheme can be generated by projecting a given vector v along each of the $n_1$ partitions. Then for each partition generating a set of signatures using the enumeration scheme provided by the enumeration component 430 with a new threshold $k_2 = 1$. The signature set for v is the union of signature corresponding to all projections. Informally, partitioning reduces the problem of generating signatures for a vector to that of generating signatures for vectors of smaller dimensions and for a smaller threshold; for a smaller threshold the number of signatures generated by enumerations becomes more tractable.

In more detail when partition component 420 and enumeration component 430 cooperate in concert, hamming component 410 can generate a random permutation $\pi$ of the dimension $\{1, \ldots, n\}$, wherein the permutation is employed to define a two-level partitioning of the dimensions (e.g., there are $n_1$ first-level partitions, and within each first-level partition, there are $n_2$ second-level partitions. Therefore, there are $n_1 \times n_2$ second-level partitions overall. The values $n_1$ and $n_2$ are parameters that can be varied to control signature generation. Each (first- or second-level) partition contains a set of dimensions contiguous under permutation $\pi$ (e.g., it is of the form $\{\pi(i): b \leq I < e\}$. The random permutation $\pi$, and therefore the partitioning, is typically generated once. The signatures of all vectors in $(U \cup V)$ are generated using the same partitioning of the dimensions.

Thus, hamming component 410 in concert with partition component 420 and enumeration component 430 can generate signatures for a vector v in the following manner. Hamming component 410 can define $$k_2 = \frac{k+1}{n_1} - 1$$

where k is the hamming distance threshold, then for each first-level partition the hamming component 410 can generate all possible subsets of second-level partitions of size $(n_2-k_2)$ thus generating one signature corresponding to each subset. Hamming component 410 can then fix a subset S and assign P the set of all dimensions belonging to partitions in S. The signature for S is the pair $<v[P], P>$, where $v[P]$ denotes the projection of vector v along dimensions in P. For example, if v=01010101, v[{1, 2, 8}]=011. As a point of observation rather than limitation, it should be noted that two signatures $<v_1[P_1], P_1>$ and $<v_2[P_2], P_2>$ are equal only if both the projections $(v_1[P_1]=v_2[P_2])$ and the subsets $(P_1=P_2)$ are equal. The total number of signatures for v is therefore $$n_1 \cdot \binom{n_2}{k_2}.$$

Figure 8:
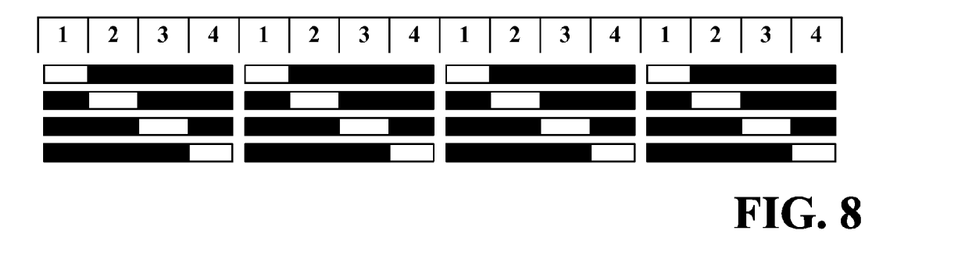
FIG. 8 provides an illustrative instance of signature generation in accordance with an aspect of the disclosed subject matter.

FIG. 8 illustrates an instance of signature generation for $n_1=3$, $n_2=4$, and k=5. By definition $k_2=1$. For each first-level partition, hamming component 410 together with partition component 420 and enumeration 430 can generate one signature corresponding to every second-level partition subset of size 3. Therefore there are 3×4=12 signatures for every vector. These signatures are represented as horizontal rectangles in FIG. 8. The darkened portion of a rectangle indicates the dimensions along which a vector is projected for generating the corresponding signature.

Figure 9:
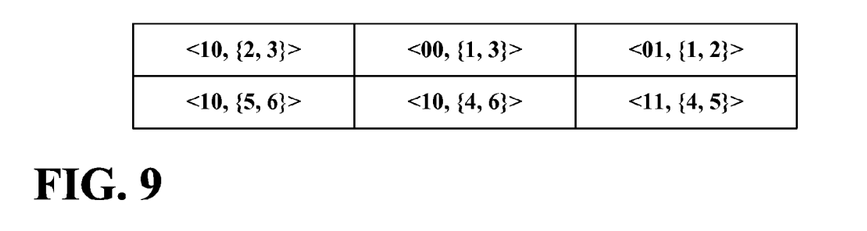
FIG. 9 depicts illustrative signatures generated in accordance with an aspect of the disclosed and claimed subject matter.

FIG. 9 depicts six illustrative signatures for the vector 010110 that can be generated by hamming component 410 where $n_1=2$, $n_2=3$, and k=3, with the implication that $k_2=1$, and that for the sake of simplicity that π is the identity permutation (e.g., π(i)=i, for all i).

Returning back to FIG. 4, the following theorem can be employed to demonstrate the correctness of the results from hamming component 410 when utilized in conjunction with partition component 420 and enumeration component 430. If $H_d(u, v) \leq k$, then $Sign(u) \cap Sign(v) \neq \emptyset$, where $Sign(u)$ and $Sign(v)$ are generated using the same random permutation π, and the same parameters $n_1$, $n_2$, and k. Thus, if $p_i (1 \leq i \leq n_1)$ denotes the ith first-level partition (e.g., $p_i=\{\pi(b_i), \ldots, \pi(b_{i+1}-1)\}$, where $$b_i = \frac{n(i-1)}{n_1}.$$

Using the fact the $H_d(u, v) \leq k$, one can show that, for some partition $$H_d(u[p_i], v[p_i]) \leq \frac{k+1}{n_1} - 1 = k_2.$$

In other words, u and v differ on at most $k_2$ dimensions belonging to partition $p_i$. Therefore, there exists $(n_2-k_2)$ second level partitions of $p_i$ such that u and v agree on all the dimensions in these partitions. If P denotes the set of all dimensions in these second-level partitions, the signature $<u[P], P>=<v[P], P>$ is common to both $Sign(u)$ and $Sign(v)$.

As a point of observation, it should be noted that since the vectors employed by hamming component 410 and its included components (e.g., partition component 420 and enumeration component 430) are representations of set, they are typically sparse with a large dimensionality n. Therefore, generating signatures directly is not necessarily efficient. For example, consider a signature $<v[P], P>$ corresponding to a set S. In order to compute $v[P]$, v needs to be projected along the dimensions in P, which could be potentially large in number. Instead, the signature can be encoded using $<P_1(v), i, S>$, where $P_1(v)$ denotes the set of dimensions in P for which v has a value 1 (e.g. {d∈P: v[d]=1}). Note that $P_1(v)$ uniquely encodes $v[P]$ and i and S uniquely identify P, and $P_1(v)$ can be computer more efficiently than $v[P]$ when v is sparse. Further, since the only operation that is performed on signatures is checking for equality, hamming component 410 can hash these signatures into 4 byte values. As a further note, hash collisions do not affect the correctness of the hamming component 410 results; however the collisions can introduce additional false positive candidate pairs, though in practice the number of false positives is negligible.

With regard to performance issues of hamming component 410 working in concert with partition component 420 and enumeration component 430 the following aspects have, by way of elucidation rather than limitation, have been noted. It has been observed that hamming component 410 and partition component 420, and enumeration component 430 included therein has good asymptotic performance. This can be demonstrated by assuming that for a particular setting of $n_1$ and $n_2$, that good filtering effectiveness can be accomplished with few signatures per input set. Thus, where hamming component 410 is provided with settings $n_1=k/\ln k$ and $n_2=2 \ln k$, and if $H_d(u, v)>7.5k$, then $Sign(u) \cap Sign(v)=\emptyset$ with probability $1-o(1)$. For this setting of parameters, the number of signatures per vector is $O(k^{2.39})$. This can be proved by assuming $H_d(u, v)>7.5k$ and connoting a dimension $d\in\{1, \ldots, n\}$ an error if $u[d] \neq v[d]$. Clearly, the number of errors is $H_d(u, v)$. Let $p_i$ denote the ith first-level partition. Define $E_i$ to be the event that the number of errors falling into $p_i<3.5 \ln k$. Define $F_i$ to be the event that errors that fall into $p_i$ fall into $\leq \ln k$ second-level partitions of $p_i$. Then $Sign(u) \cap Sign(v) \neq \emptyset$ if and only if there exists a partition $p_i$ for which the event $F_i$ occurs. Therefore $Pr[Sign(u) \cap Sign(v) \neq \emptyset]$:

$$= Pr[F_1 \cup \ldots \cup F_{n_1}]$$

$$\leq \sum_{1 \leq i \leq n_1} Pr[F_i]$$

$$= \sum_{1 \leq i \leq n_1} Pr[F_i|E_i]Pr[E_i] + Pr[F_i|\overline{E_i}]Pr[\overline{E_i}]$$

$$\leq \sum_{1 \leq i \leq n_1} Pr[E_i] + Pr[F_i|\overline{E_i}]$$

By applying Chernoff bounds, it can be shown that both $Pr[E_1]$ and $Pr[F_i|\overline{E_i}]$ are $o(\ln k/k)$. Since $n_1=k/\ln k$, it follows that $Pr[Sign(u) \cap Sign(v) \neq \emptyset]=o(1)$. The number of signatures is $$(k/\ln k)\binom{2\ln k}{\ln k},$$

which is approximates to $(k/\ln k)2^{2 \ln k}$, which evaluates to $O(k^{2.39})$.

It should be noted as observation rather than limitation, that the constants in the foregoing explication are merely representative as slightly different performance characteristics can be obtained where the values associated with $n_1$ and $n_2$ are varied. Nevertheless, the foregoing elucidation indicates that good filtering can be obtained using $O(k^{2.39})$ signatures, which is independent of n. Such a property can be crucial in order to be able to handle sparse vectors—which is the case when vectors are representative of set—where n could be very large.

Figure 5:
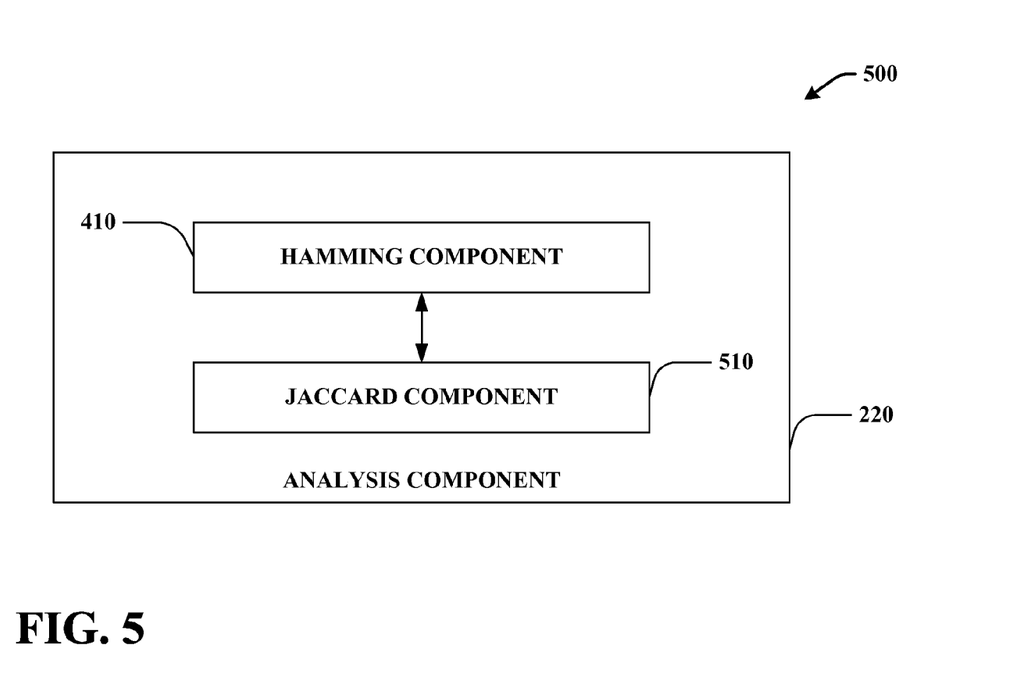
FIG. 5 depicts a further aspect of analysis component in accordance with an aspect of the subject matter as claimed.

FIG. 5 provides a further enhancing aspect 500 of analysis component 220 wherein hamming component 410 can operate with jaccard component 510 to ascertain similarity for jaccard SSJoins. It has been observed in a special case that when all input sets are equi-sized then two sets can have jaccard similarity$\geq \gamma$ if their hamming distance is $$\leq \frac{2l(1+\gamma)}{1-\gamma},$$

where l denotes a common set size. Consequently jaccard component 510 can employ this observation to convert jaccard SSJoins with threshold $\gamma$ to an equivalent hamming SSJoin with threshold $$\frac{2l(1+\gamma)}{1-\gamma},$$

which hamming component 410 can thereafter utilize in a manner similar to that enunciated in relation to FIG. 4.

Additionally, jaccard component 510 in a more generalized case can employ the following observation to divide a general jaccard SSJoin instance into smaller instances, each of which computes an SSJoin on sets of roughly equal size and thereafter covert the smaller jaccard SSJoin instances to hamming SSJoin instances after which hamming component 410 can employ for signature generation as exposited supra. It has been observed that if two sets have high jaccard similarity, then they should have roughly similar sizes as formalized below:

$$\text{If } J_s(r,s) \geq \gamma, \text{ then } \gamma \leq \frac{|r|}{|s|} \leq \frac{1}{\gamma}.$$

Formally, this can be understood if one considers a jaccard SSJoin with threshold $\gamma$ between R and S with intervals $I_i$ (i=1, 2, ...) that partition the set of positive integers. For each interval $I_i=[l_i, r_i]$, the right end of the interval $$r_i = \left\lfloor \frac{l_i}{\gamma} \right\rfloor.$$

Using the fact that if $J_s(r, s) \geq \gamma$, then $$\gamma \leq \frac{|r|}{|s|} \leq \frac{1}{\gamma}$$

it can be shown that if $|s| \in I_i$ and $J_s(r, s) \geq \gamma$, then $|r| \in I_{i-1} \cup I_i \cup I_{i+1}$. Based on this observation, jaccard component 510 can construct subsets $R_1, R_2, \ldots$ of R as follows. For each $r \in R$, if $|r| \in I_i$ jaccard component 510 can add the set r to both $R_i$ and $R_{i+1}$. Jaccard component 510 can then construct subsets $S_1, S_2, \ldots$ of S, symmetrically and perform a hamming SSJoin between $R_i$ and $S_i$ with threshold $$k_i = 2\left(\frac{1-\gamma}{1+\gamma}\right)r_i,$$

and take the duplicate-free union of all the SSJoin outputs. The correctness of this approach follows from the observation that if $J_s(r, s) \geq \gamma$, and $r \in R_i$, $s \in S_i$, then it can be shown that $$H_d(r, s) \leq \frac{1-\gamma}{1+\gamma}(|r|+|s|) \leq 2\left(\frac{1-\gamma}{1+\gamma}\right)r_i = k_i.$$

However, jaccard component 510 rather than explicitly constructing the subsets $R_i$ and $S_i$ jaccard component 510 can obtain the same effect by and then computing the SSJoin between R and S. Essentially, jaccard component 510 attaches the number i to the signatures of $R_i$ and $S_i$, which ensures that signatures of $R_i$ and $S_j$ ($I \neq j$) do not collide.

Figure 6:
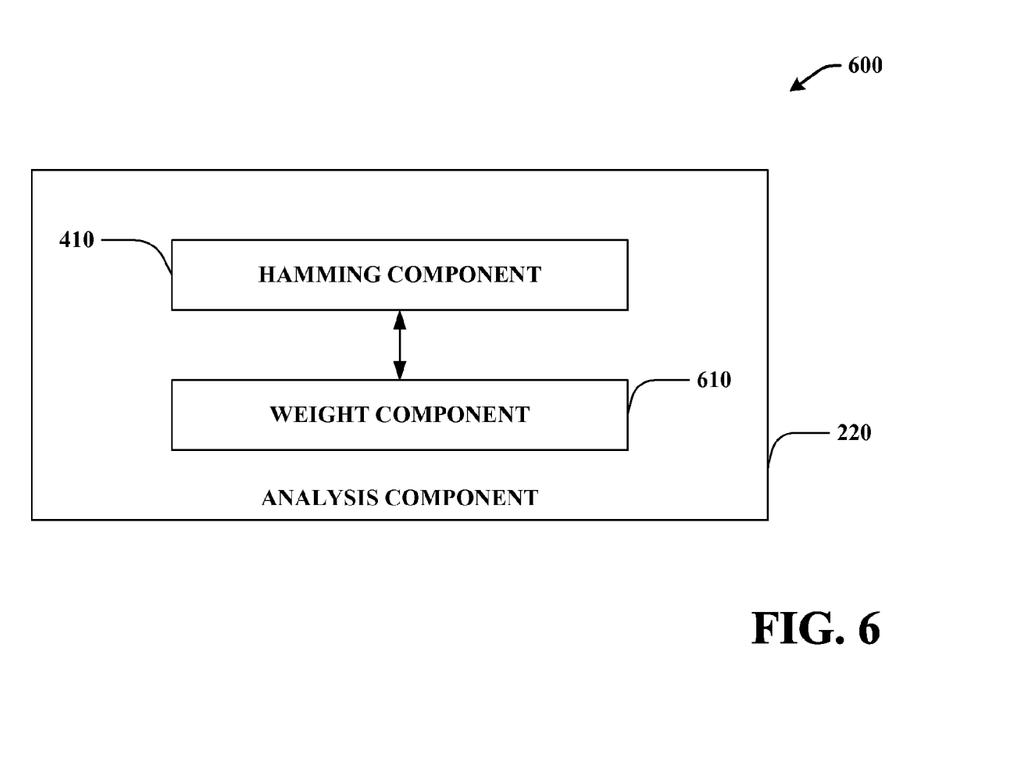
FIG. 6 provides yet a further detailed depiction of an analysis component in accordance with the disclosed subject matter.

FIG. 6 illustrates a further aspect 600 of analysis component 220 that can include weight component 610 that can function in concert with hamming component 410. For many applications using set-similarity, some elements are more important than others for the purpose of defining similarity, and these differences in the importance are naturally captured using element weights. A well known example is the use of weights based on inverse document frequency (IDF) used in Information Retrieval which essentially captures the intuition that less frequent words are more significant that frequent words for determining document similarities.

Weight component 610 can convert a weighted SSJoin instance to an unweighted one by making w(e) (a weight associated with each element e) copies of each element e, using standard rounding techniques if weights are nonintegral, and thereafter employ hamming component 410. However, there are instances where this approach may prove unsatisfactory for the following reason. Consider an unweighted hamming SSJoin with threshold k. As noted above good filtering can be achieved by using $O(k^{2.39})$ signatures. Further, consider a weighted hamming SSJoin with threshold $\alpha k$, where all element weights are $\alpha$. Clearly if this is the case, the weighted SSJoin is identical to the unweighted one. However, if weight component 610 were to utilize this approach $O(\alpha^{2.39} k^{2.39})$ signatures would be required for the same filtering effectiveness, which is undesirable since $\alpha$ can be made arbitrarily large. Accordingly, weight component 610 can employ the following heuristic methodology wherein weight component 610 generates signatures for a set of s by enumerating all minimal subset s' of s with weighted size at last T. A subset s' is minimal if no proper subset of s' has weighted size $\geq$T. For each subset s', weight component 610 orders the elements in descending order of weights, and picks the smallest prefix of this ordering such that the weights of the elements in the prefix add up to at least a least a pruning threshold that can be used to control weight component 610. The signature set for s' is the set of all such distinct prefixes.

Figure 7:
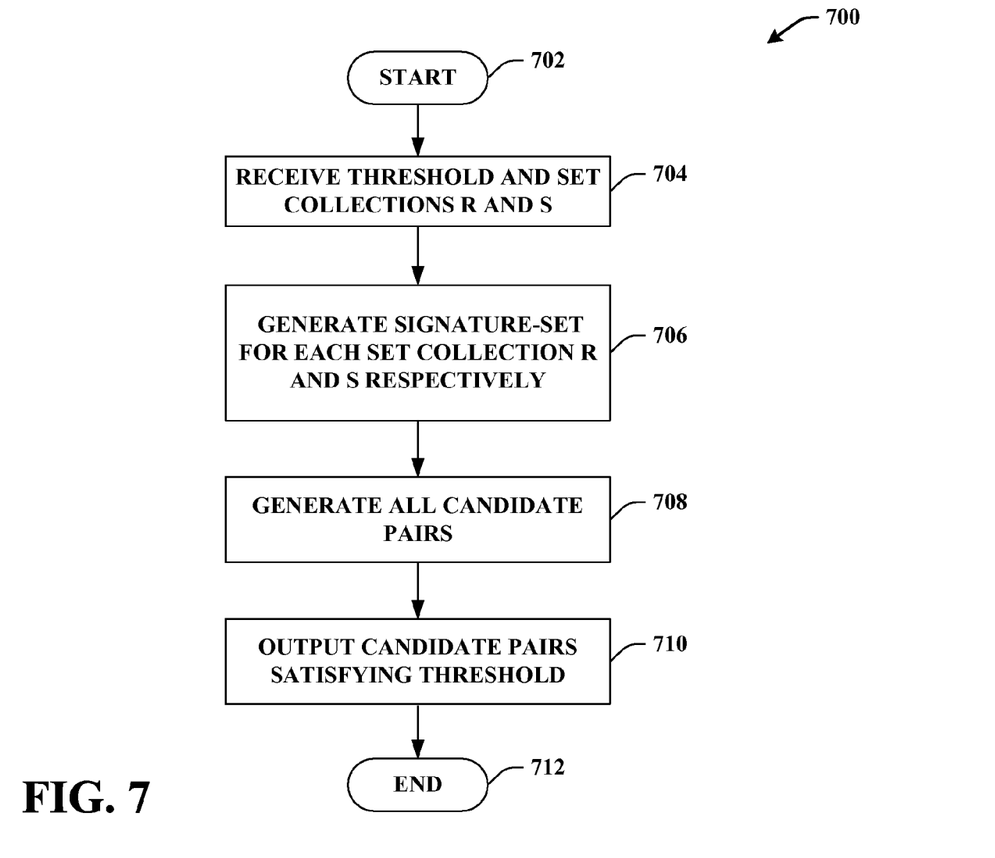
FIG. 7 illustrates a flow diagram of a methodology that facilitates and effectuates efficient exact set-similarity joins in accordance with an aspect of the disclosed and claimed subject matter.

In view of the exemplary systems shown and described supra, methodologies that may be implemented in accordance with the disclosed subject matter will be better appreciated with reference to the flow chart of FIG. 7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 7 illustrates a method 700 that can be employed to effectuate efficient exact set-similarity joins. Method 700 commences at 702 whereupon various sundry initialization tasks and background activities are performed. Upon completion of these various tasks and activities, method 700 proceeds to 704 where collections R and S are received together with threshold $\gamma$. At 706 the methodology generates signature-sets Sign(r) and Sign(s) for each respective r∈R and s∈S, whereupon the method proceeds to 708 where all candidate pairs (r, s), r∈R, s∈S that satisfy the condition Sign(r)∩Sign(s) are generated. Once all candidate pairs (r, s) have been generated, the method progresses to 710 where candidate pairs (r, s) that satisfy the similarity relationship Sim(r, s)≧$\gamma$ are output, after which the method can terminate at 712.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g. methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 10:
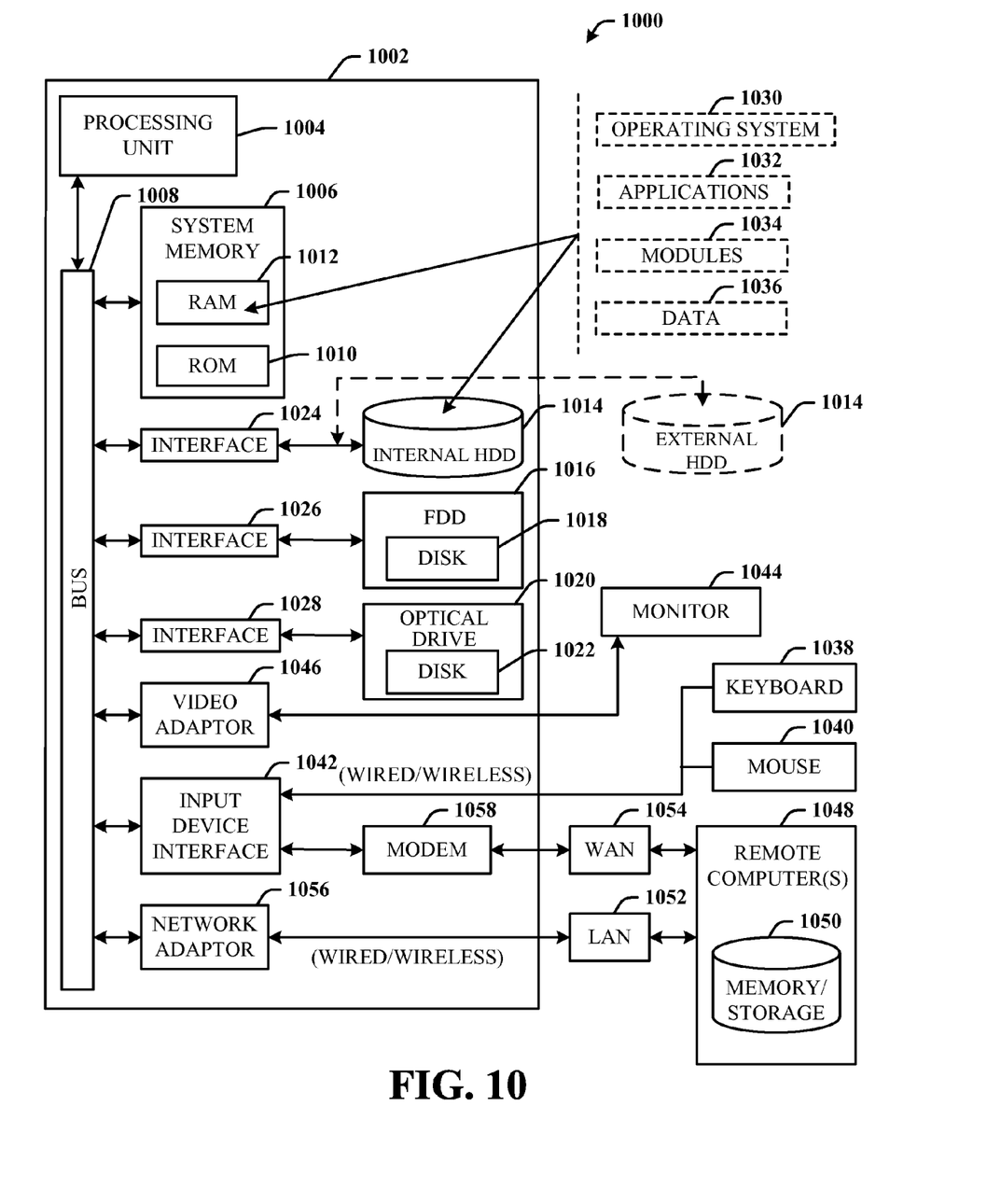
FIG. 10 illustrates a block diagram of a computer operable to execute the disclosed system.

Referring now to FIG. 10, there is illustrated a block diagram of a computer operable to execute the disclosed machine (e.g., computer) implemented system. In order to provide additional context for various aspects thereof, FIG. 10 and the following discussion are intended to provide a brief, general description of a suitable computing environment 1000 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the claimed subject matter can be implemented with various commercially available operating systems or combinations of operating systems.

A user can enter commands and information into the computer 1002 through one or more wired/wireless input devices, e.g. a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+Mbps in the 2.4 GHz band. Products can contain more than one band (e.g., dual band), so the networks can provide real-world performance similar to the basic 10BaseT wired Ethernet networks used in many offices.

Figure 11:
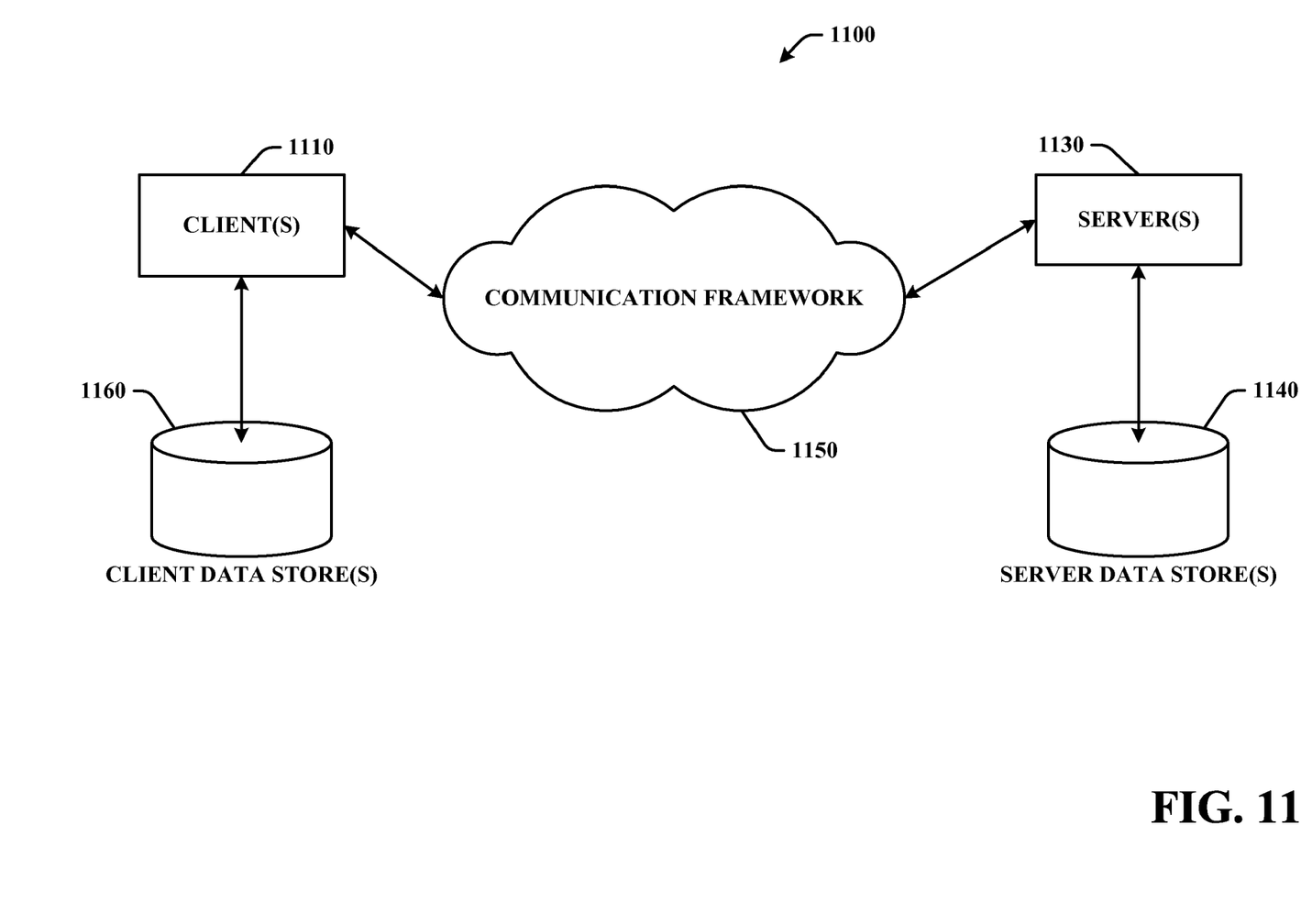
FIG. 11 illustrates a schematic block diagram of an exemplary computing environment for processing the exact similarity join architecture in accordance with another aspect.

Referring now to FIG. 11, there is illustrated a schematic block diagram of an exemplary computing environment 1100 for processing the exact similarity join architecture in accordance with another aspect. The system 1100 includes one or more client(s) 1102. The client(s) 1102 can be hardware and/or software (e.g., threads, processes, computing devices).

The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that effectuates exact similarity joins between a first and second collection of sets, comprising:
    a processor;
    a memory communicatively coupled to the processor, the memory having stored therein computer-executable instructions configured to implement components of the system that effectuates exact similarity joins between the first and second collection of sets, wherein the exact similarity joins produce a correct result and carry specific performance guarantees, the components including:
    an analysis component that receives the first and second collection of sets and a threshold value and outputs all candidate pairs of sets from the first and second collection of sets based at least in part on a similarity that equals or exceeds the threshold, the analysis component further generating signatures for each of the first and second collection of sets, the signatures being a function of the respective collection of sets and randomization, the analysis component further including:
        a sizing component that gauges a number of signatures generated for the first and second collection of sets;
        an effectiveness component that determines a number of false positive candidate pairs and quantifies a degree to which false positives are minimized; and
        a costing component that computes a total cost for computing the exact similarity joins between the first and second collection of sets.

2. The system of claim 1, wherein the analysis component generates signatures for each set such that whenever two sets have similarity greater than the threshold, they share at least one signature.

3. The system of claim 1, wherein the analysis component generates all candidate pairs of input sets which share a signature.

4. The system of claim 1, wherein the analysis component outputs a subset of the candidate pairs whose similarity is greater than the threshold.

5. The system of claim 1, wherein the analysis component generates signatures when the similarity is specified using hamming distance.

6. The system of claim 1, wherein the analysis component generates signatures when the similarity is specified using Jaccard similarity or weighted Jaccard similarity.

7. The system of claim 1, wherein the analysis component generates signatures for an arbitrary set-similarity function that has a property that a similar function value for any two sets imposes an upper-bound on a hamming distance of the sets.

8. The system of claim 1, wherein the output of candidate pairs is implemented on a general purpose database system.

9. The system of claim 1, wherein the exact similarity joins between a first and second collection of strings is effectuated by tokenizing strings into sets.

10. A method implemented on a machine, the method comprising:
    effectuating similarity joins between a first and second collection of sets, wherein the similarity joins are exact such that the similarity joins produce a correct result and carry specific performance guarantees, the effectuating including:
        receiving the first and second collection of sets and a threshold value;
        outputting all candidate pairs of sets from the first and second collection of sets based at least in part on a similarity that equals or exceeds the threshold;
        generating signatures for each of the first and second collection of sets, the signatures being a function of the respective collection of sets and randomization;
        gauging a number of signatures generated for the first and second collection of sets;
        determining a number of false positive candidate pairs and quantifying a degree to which false positives are minimized; and
        computing a total cost for computing the exact similarity joins between the first and second collection of sets.

11. The method of claim 10, further comprising generating signatures for each set such that whenever two sets have similarity greater than the threshold, they share at least one signature.

12. The method of claim 10, further comprising generating all candidate pairs of input sets which share a signature.

13. The method of claim 10, wherein the outputting further includes outputting a subset of the candidate pairs whose similarity is greater than the threshold.

14. The method of claim 10, further comprising generating signatures when the similarity is specified utilizing hamming distance.

15. The method of claim 10, further comprising generating signatures when the similarity is specified utilizing Jaccard similarity or weighted Jaccard similarity.

16. The method of claim 10, further comprising generating signatures for an arbitrary set-similarity function that has a property that a similar function value for any two sets imposes an upper-bound on a hamming distance of the sets.

17. The method of claim 10, wherein the outputting of candidate pairs is implemented on a general purpose database system.

18. The method of claim 10, wherein the exact similarity joins between a first and second collection of strings is effectuated by tokenizing strings into sets.

19. A system that facilitates and effectuates efficient exact similarity joins between a first set collection and a second set collection, comprising:
- a processor;
- means operable by the processor for receiving the first set collection, the second set collection, and a threshold value;
- means operable by the processor for outputting all candidate pairs of sets from the first set collection and second set collection based at least in part on a similarity that equals or exceeds the threshold value;
- means operable by the processor for generating signatures for each of the first set collection and the second set collection, the signatures being a function of the respective set collection and randomization;
- means operable by the processor for gauging a number of signatures generated for the first set collection and the second set collection;
- means operable by the processor for determining a number of false positive candidate pairs and quantifying a degree to which false positives are minimized; and
- means operable by the processor for computing a total cost for computing the exact similarity joins between the first set collection and the second set collection.

20. The system of claim 19, further comprising means for generating signatures when the similarity is specified using one of hamming distance, Jaccard similarity, or weighted Jaccard similarity.

21. A method for facilitating exact similarity joins between a first and a second collection of sets, comprising:
- employing a processor executing computer executable instructions stored on a computer readable storage medium to implement the following acts:
  - receiving the first and second collection of sets and a threshold value;
  - representing the first and second collection of sets as binary vectors;
  - generating candidate pairs of sets from the first and second collection of sets based on a hamming distance between the binary vectors, if the hamming distance between the binary vectors is below the threshold value;
  - generating signatures for each of the first and second collection of sets, the signatures being a function of the respective collection of sets and randomization;
  - gauging a number of signatures generated for the first and second collection of sets;
  - determining a number of false positive candidate pairs and quantifying a degree to which false positives are minimized; and
  - computing a total cost for computing the exact similarity joins between the first and second collection of sets.

* * * * *